United States Patent
Miyamoto et al.

(10) Patent No.: US 11,440,202 B2
(45) Date of Patent: Sep. 13, 2022

(54) ROBOT, CONTROL DEVICE AND CONTROL METHOD

(71) Applicant: Seiko Epson Corporation, Tokyo (JP)

(72) Inventors: Tsutomu Miyamoto, Shiojiri (JP); Toshiyuki Kamiya, Fujimi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 169 days.

(21) Appl. No.: 16/517,719

(22) Filed: Jul. 22, 2019

(65) Prior Publication Data

US 2020/0023525 A1 Jan. 23, 2020

(30) Foreign Application Priority Data

Jul. 23, 2018 (JP) .............................. JP2018-137653

(51) Int. Cl.
*B25J 13/00* (2006.01)
*B25J 13/08* (2006.01)

(52) U.S. Cl.
CPC .................................. *B25J 13/087* (2013.01)

(58) Field of Classification Search
CPC ........ B25J 13/087; B25J 19/063; B25J 9/162; B25J 9/1674; G05B 2219/39195; G05B 2219/40323
USPC .................................. 700/245, 258; 702/191
See application file for complete search history.

(56) References Cited

U.S. PATENT DOCUMENTS

| 4,816,732 | A | * | 3/1989 | Wilson | H01L 21/68707 318/568.21 |
| 7,742,836 | B2 | * | 6/2010 | Masuya | G05B 19/4061 700/174 |
| 2007/0001638 | A1 | * | 1/2007 | Gray | B25J 9/1692 318/568.11 |
| 2012/0048027 | A1 | | 3/2012 | Hashiguchi et al. | |
| 2012/0259464 | A1 | | 10/2012 | Morioka et al. | |

FOREIGN PATENT DOCUMENTS

| JP | 2001051721 A | 2/2001 |
| JP | 2012-139769 A | 7/2012 |
| JP | 2012-218094 A | 11/2012 |

* cited by examiner

*Primary Examiner* — Dalena Tran
(74) *Attorney, Agent, or Firm* — Gang Yu

(57) ABSTRACT

A robot includes a robot main body having a platform and a robot arm displaced with respect to the platform, a vibration sensor provided to the robot main body to detect a vibration of the robot main body, a collision detection section configured to detect a collision between the robot main body and a physical object based on an output from the vibration sensor, wherein the collision detection section includes a first detection section configured to detect the collision based on a vibration signal output from the vibration sensor, and a second detection section configured to detect the collision based on an extracted vibration signal obtained by extracting a vibration component with a frequency not lower than a first predetermined value from the vibration signal.

6 Claims, 12 Drawing Sheets

ROBOT, CONTROL DEVICE AND CONTROL METHOD

The present application is based on, and claims priority from, JP Application Serial Number 2018-137653, filed Jul. 23, 2018, the disclosure of which is hereby incorporated by reference herein in its entirety.

BACKGROUND

1. Technical Field

The present disclosure relates to a robot, a control device and a control method.

2. Related Art

The robot described in JP-2012-218094 (Document 1) has a base platform, a base end arm, a first wrist element, a first intermediate arm, a second wrist element, a second intermediate arm, a third wrist element and a tip arm, wherein the base platform is fixed to the floor surface, the base end arm is rotatably coupled to the base platform, the first wrist element is rotatably coupled to the base end arm, the first intermediate arm is rotatably coupled to the first wrist element, the second wrist element is rotatably coupled to the first intermediate arm, the second intermediate arm is rotatably coupled to the second wrist element, the third wrist element is rotatably coupled to the second intermediate arm, and the tip arm is rotatably coupled to the third wrist element. Further, this robot has a first force sensor and a second force sensor disposed between the base platform and the tip arm, and is capable of detecting a collision or the like between the robot and a foreign matter with the first force sensor and the second force sensor.

However, depending on the hardness of a surface of the robot or the foreign matter colliding with the robot, collision time and so on, there is a possibility that it is unachievable for the robot described in Document 1 to detect the contact with the foreign matter.

SUMMARY

A robot according to an aspect of the present disclosure includes a robot main body having a platform and a robot arm displaced with respect to the platform, a vibration sensor provided to the robot main body to detect a vibration of the robot main body, and a collision detection section configured to detect a collision between the robot main body and a physical object based on an output from the vibration sensor, wherein the collision detection section includes a first detection section configured to detect the collision based on a vibration signal output from the vibration sensor, and a second detection section configured to detect the collision based on an extracted vibration signal obtained by extracting a vibration component with a frequency not lower than a first predetermined value from the vibration signal.

DESCRIPTION OF EXEMPLARY EMBODIMENTS

Hereinafter, a robot, a control device and a control method according to the present disclosure will be described in detail based on some embodiments shown in the accompanying drawings.

First Embodiment

Figure 1:
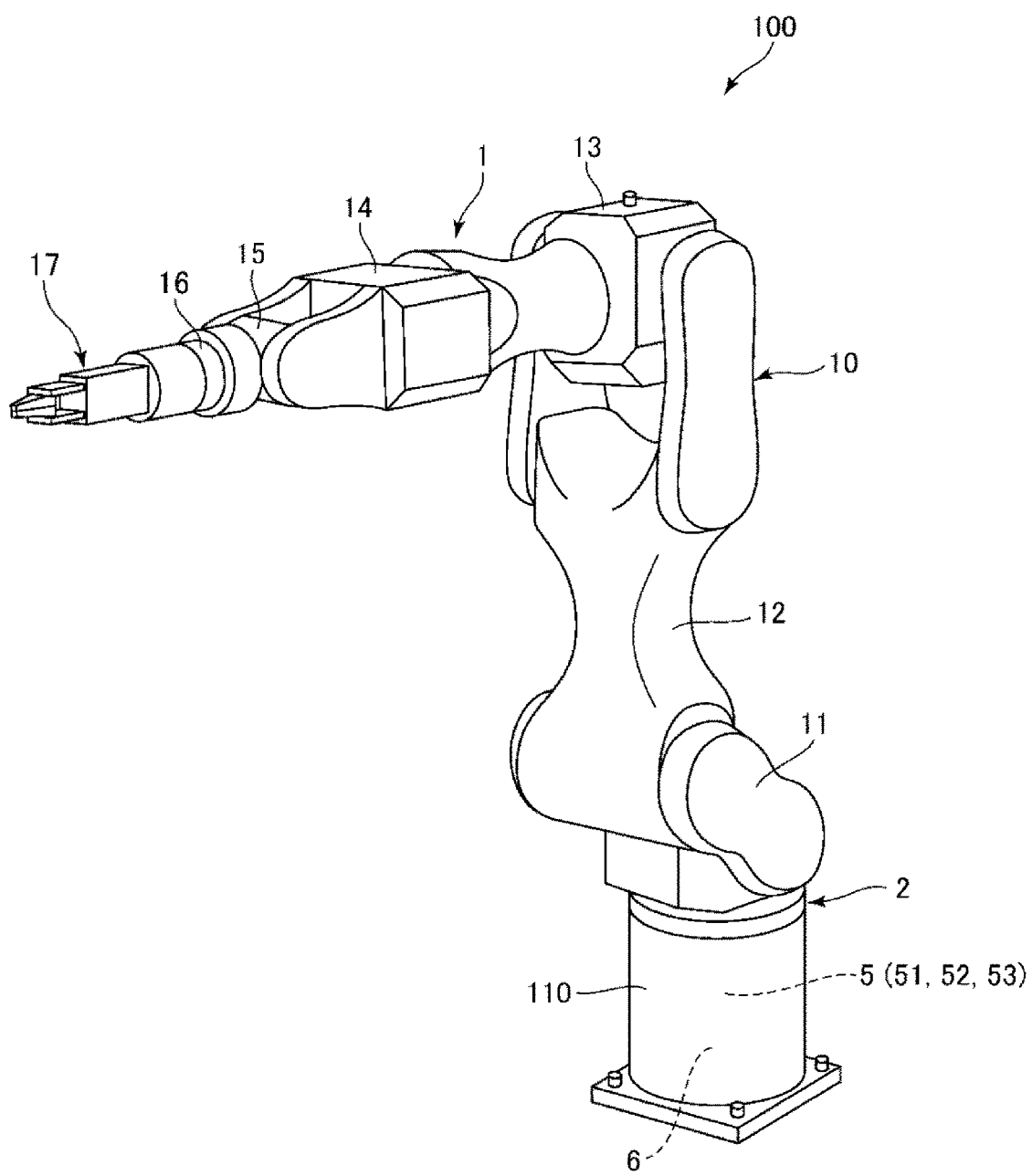
FIG. 1 is a perspective view showing a robot according to a first embodiment of the present disclosure.
Figure 2:
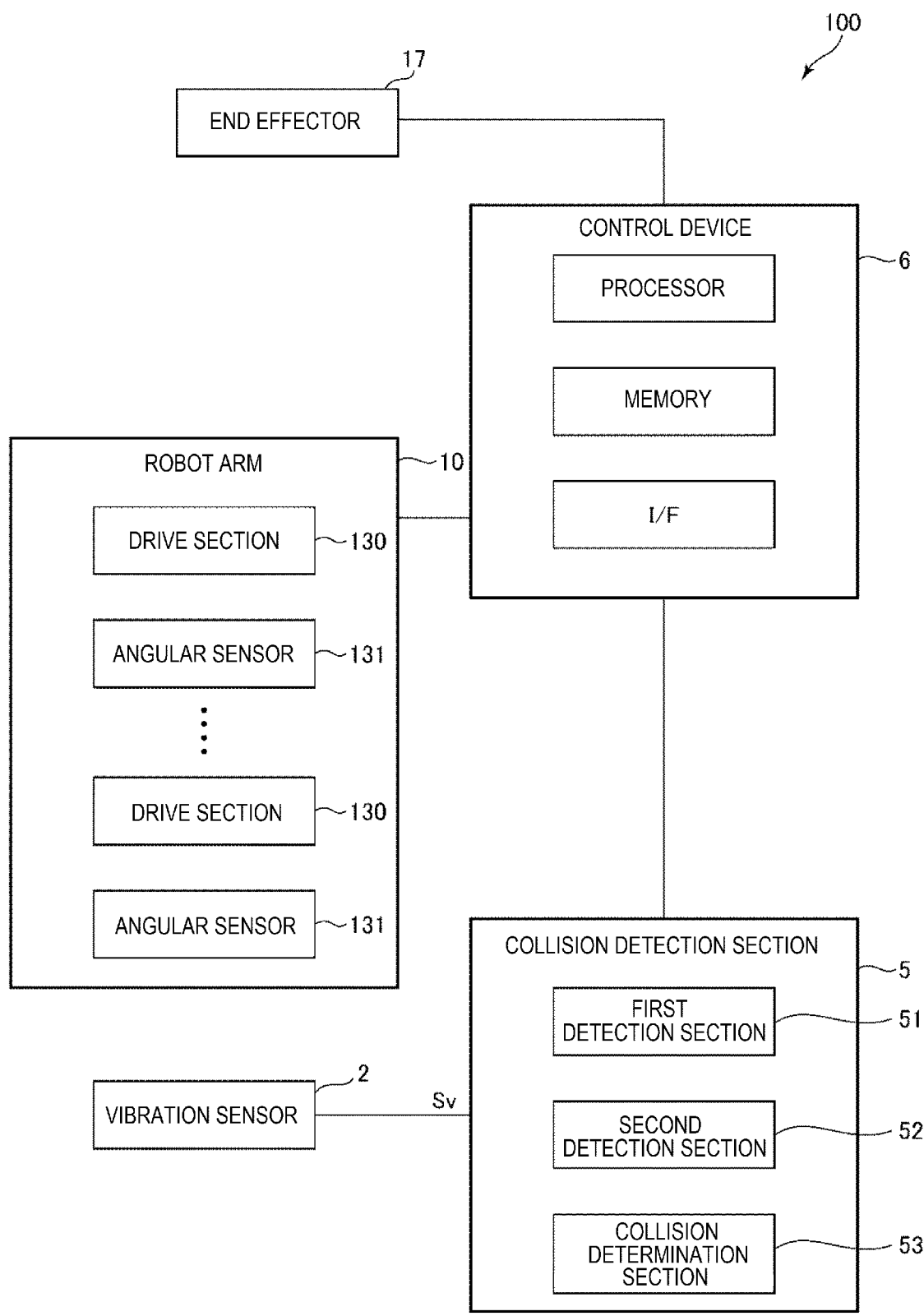
FIG. 2 is a block diagram of the robot shown in FIG. 1.
Figure 3:
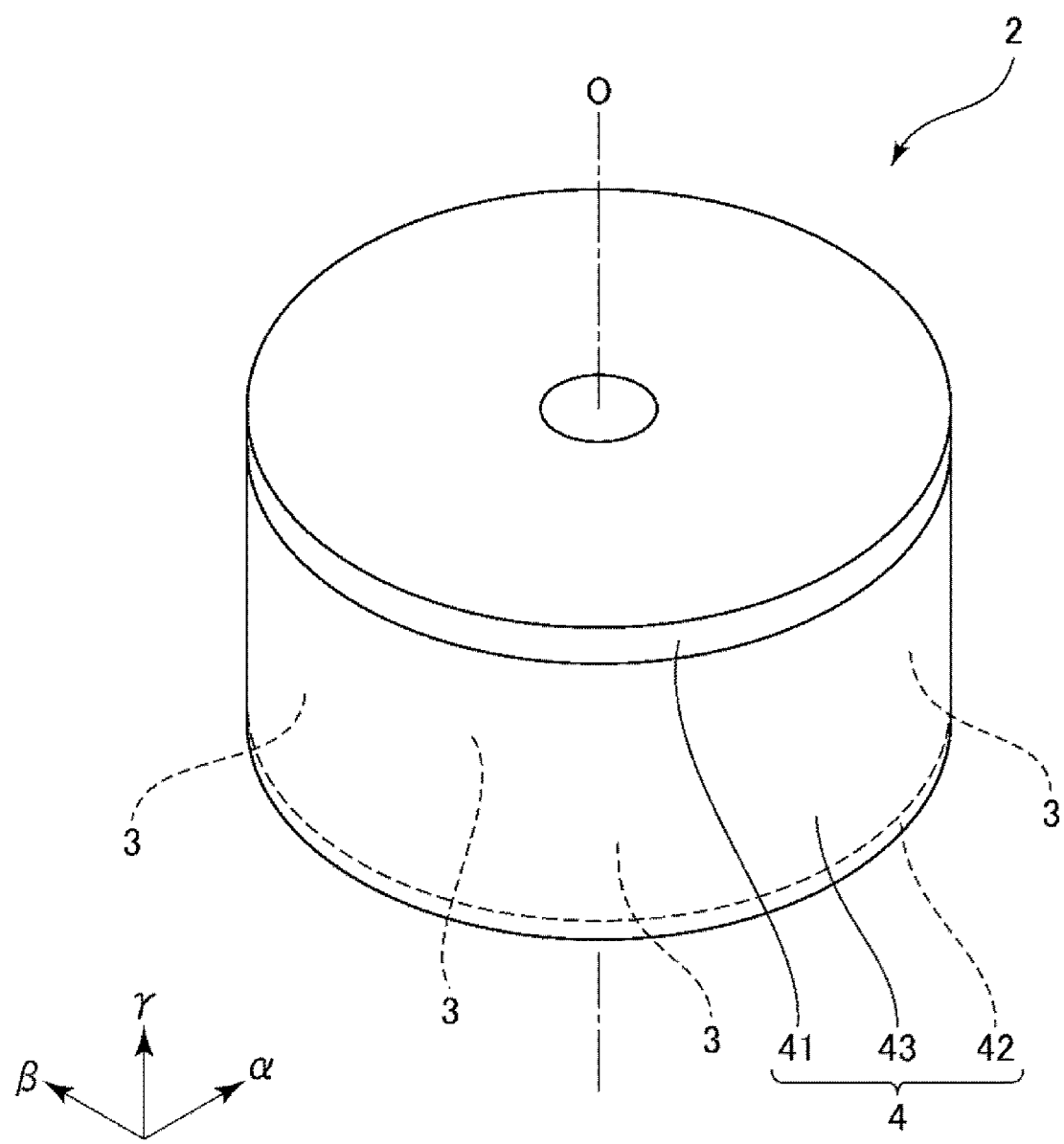
FIG. 3 is a perspective view of a vibration sensor provided to the robot shown in FIG. 1.
Figure 4:
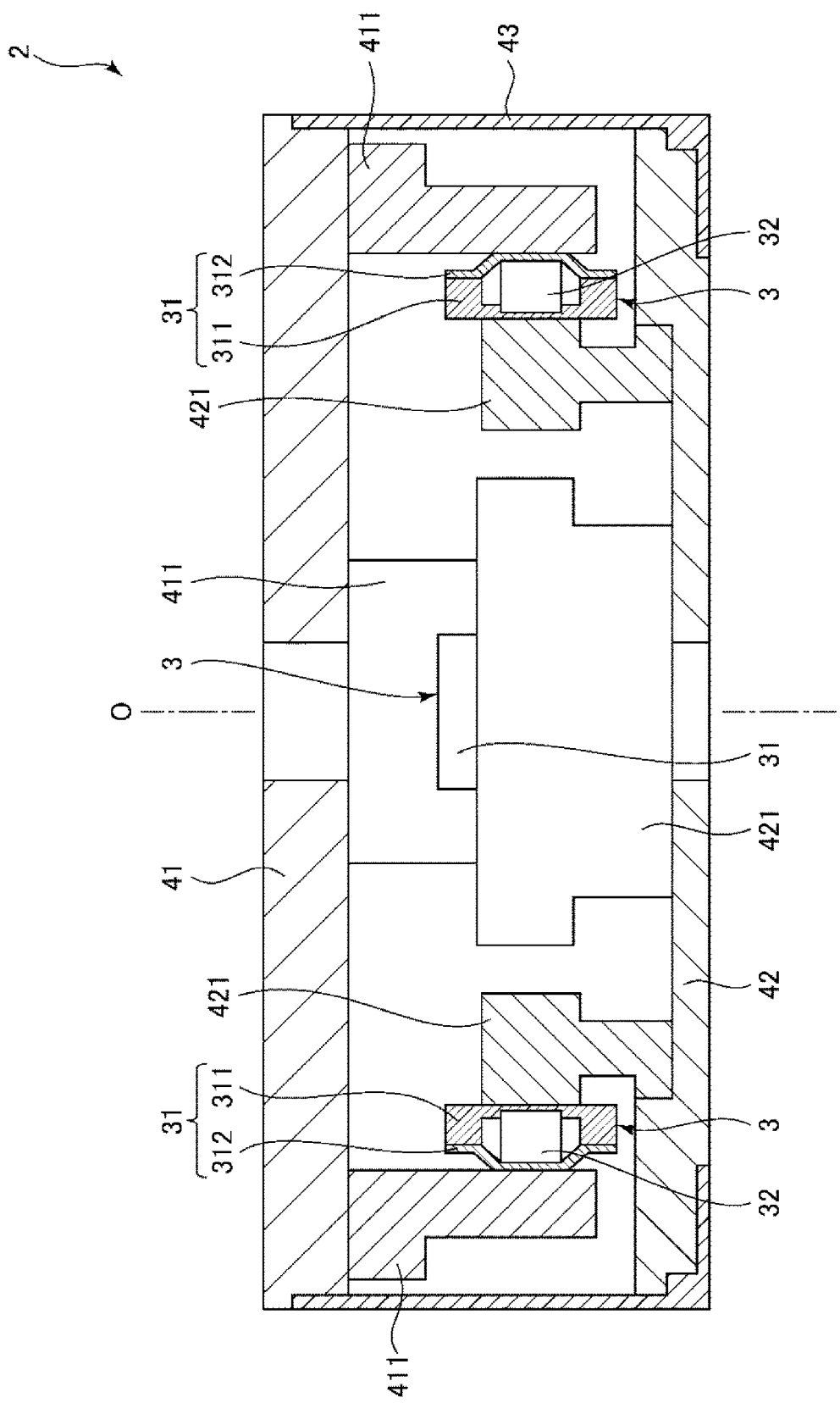
FIG. 4 is a vertical cross-sectional view of the vibration sensor shown in FIG. 3.
Figure 5:
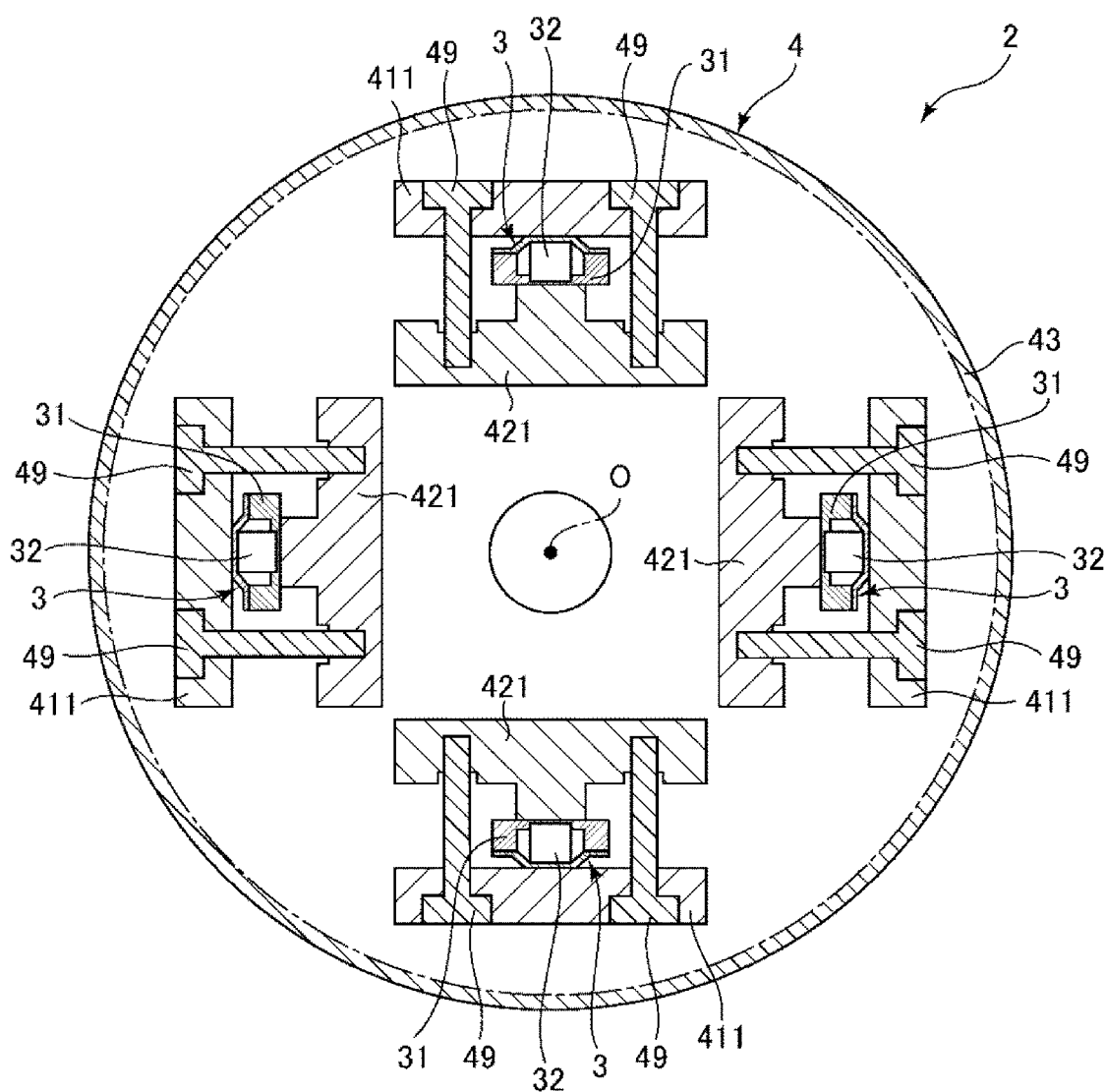
FIG. 5 is a transverse cross-sectional view of the vibration sensor shown in FIG. 3.
Figure 6:
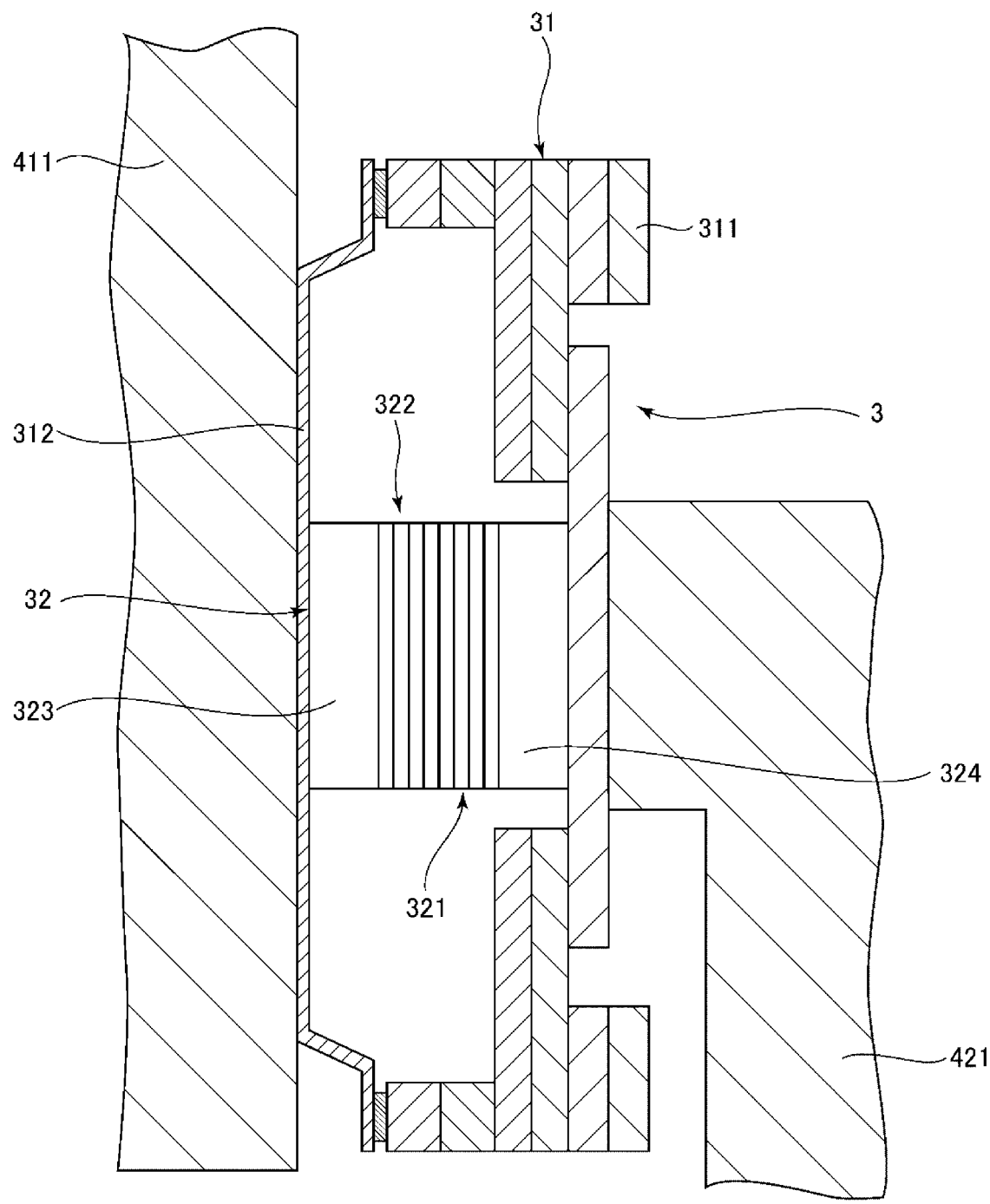
FIG. 6 is a cross-sectional view of a sensor device provided to the vibration sensor shown in FIG. 3.
Figure 7:
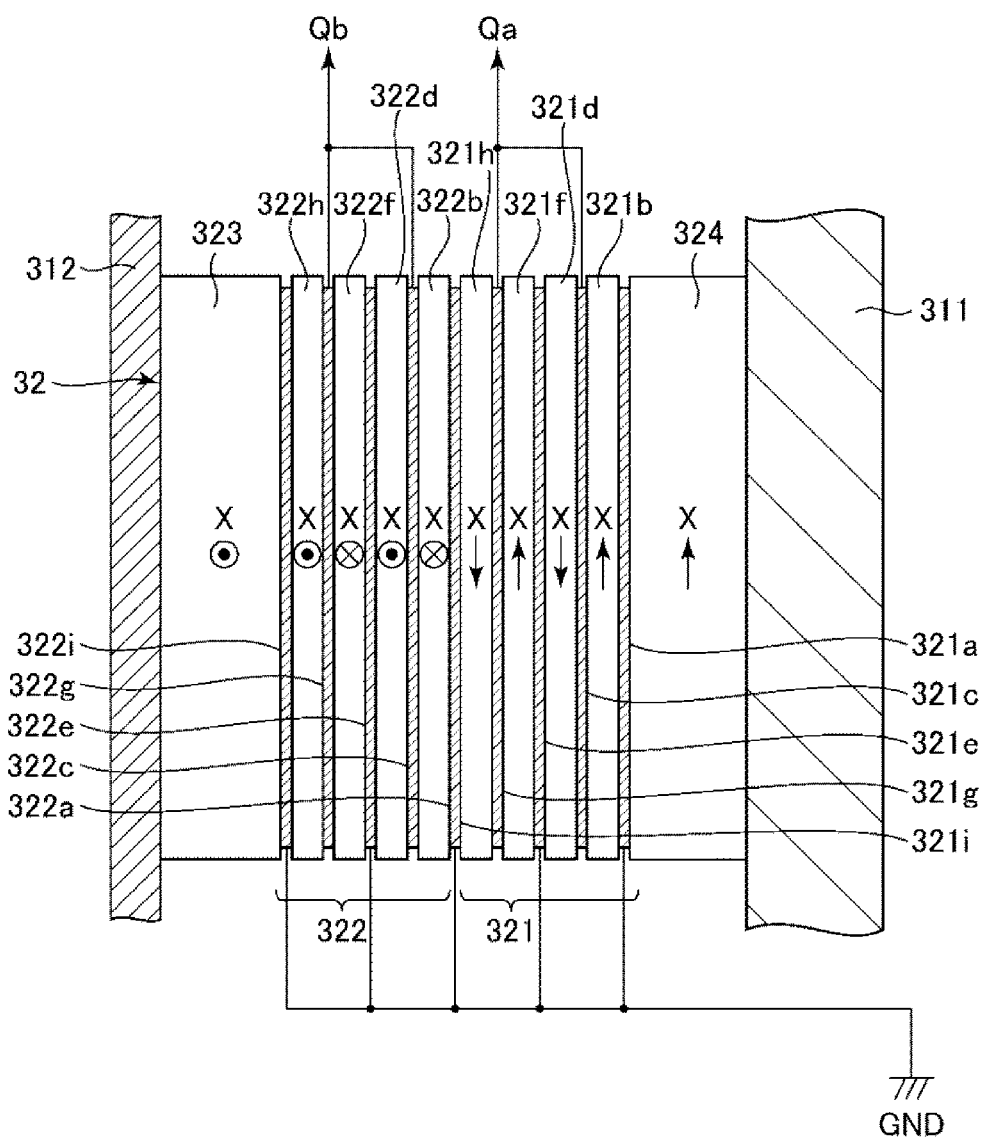
FIG. 7 is a cross-sectional view of a force detection element provided to the sensor device shown in FIG. 6.
Figure 8:
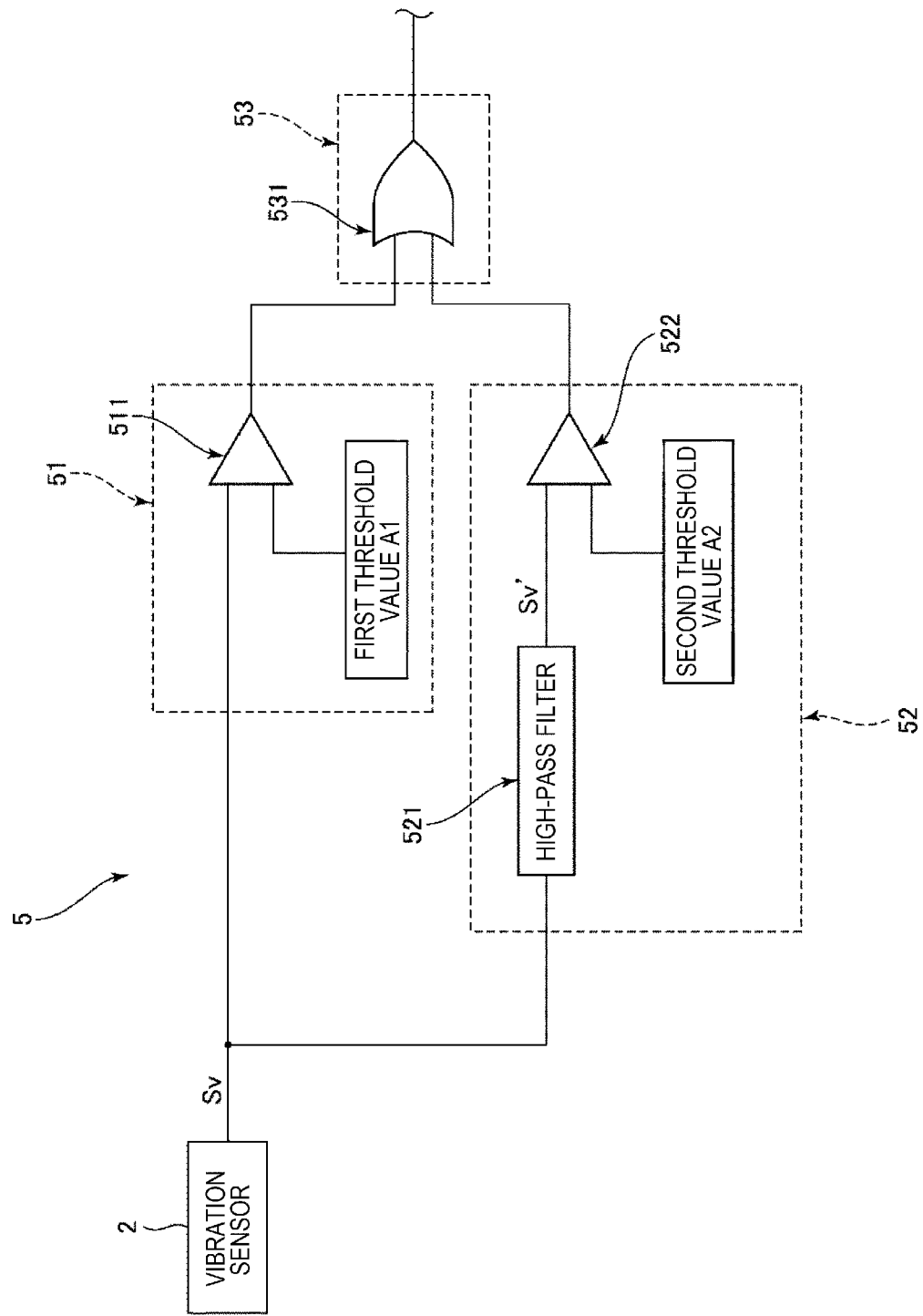
FIG. 8 is a block diagram of a collision detection section provided to the robot shown in FIG. 1.
Figure 9:
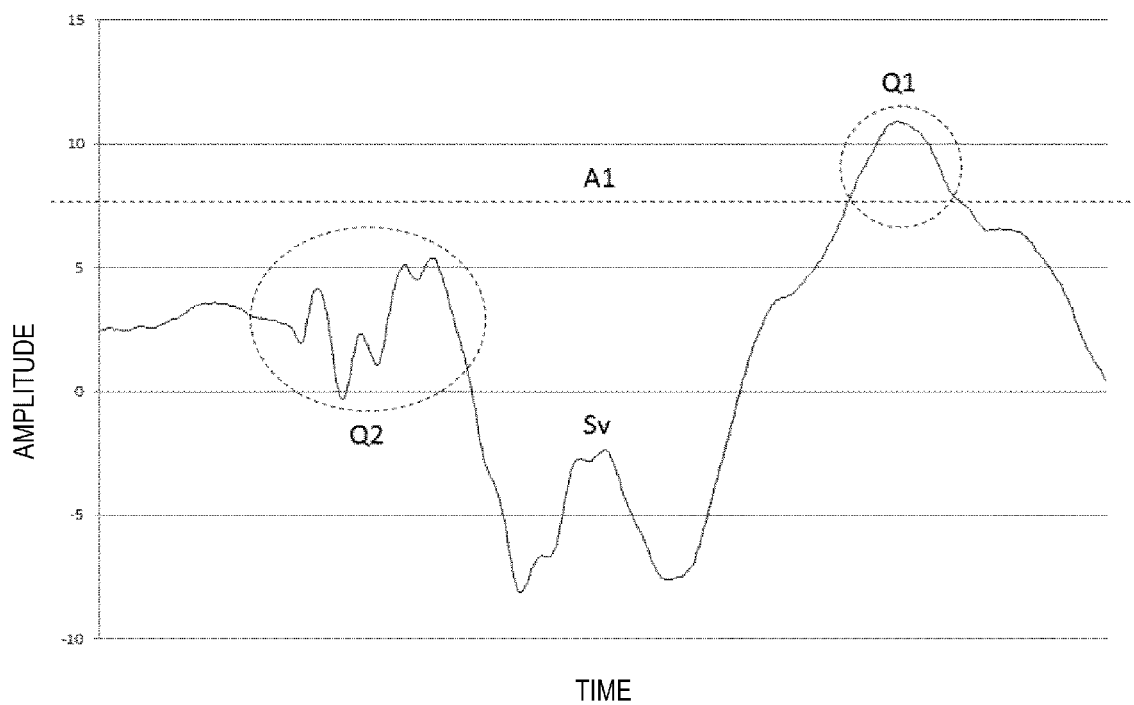
FIG. 9 is a graph showing an example of a vibration signal output from the vibration sensor.
Figure 10:
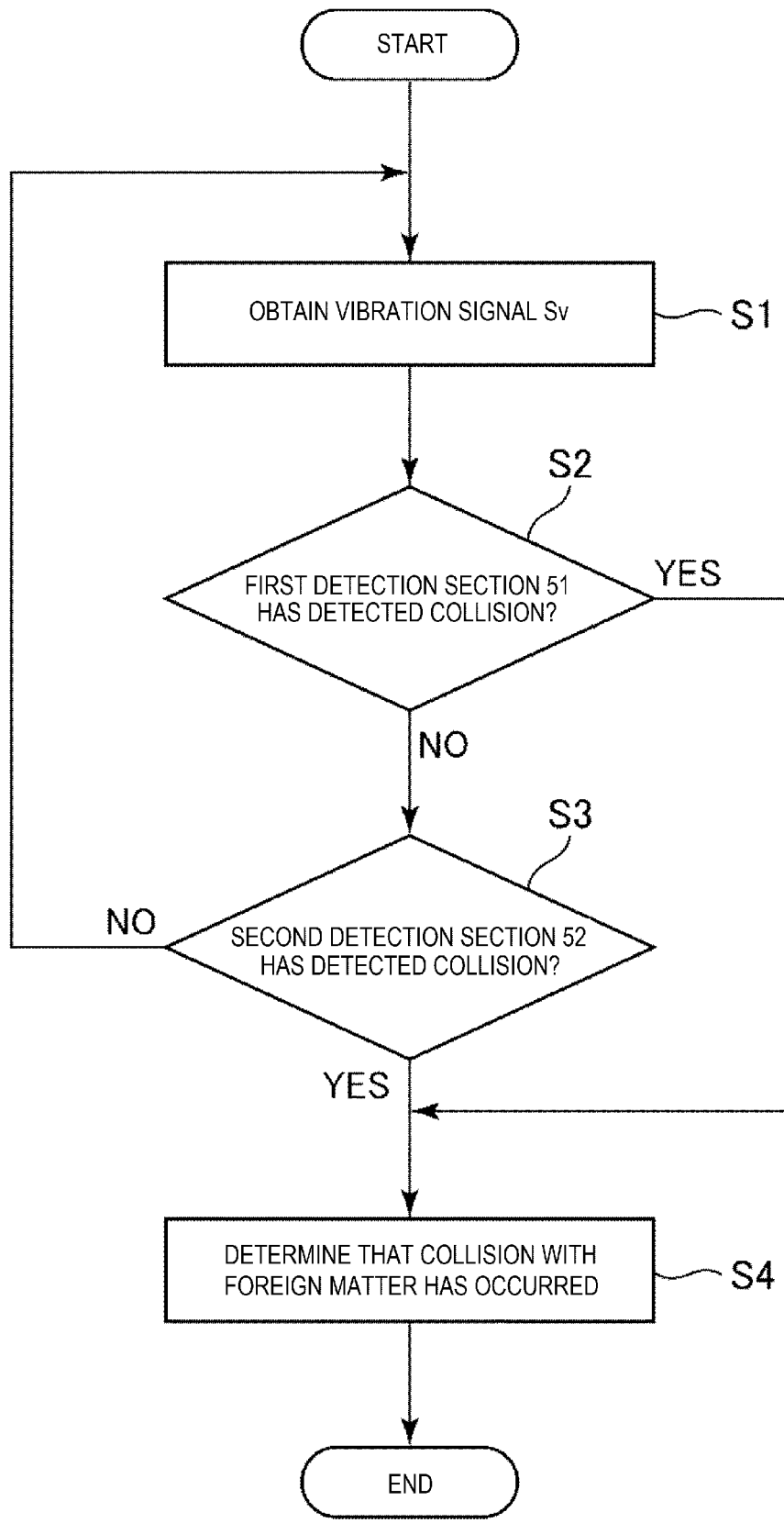
FIG. 10 is a flowchart showing a method of controlling the robot shown in FIG. 1.

FIG. 1 is a perspective view showing a robot according to a first embodiment of the present disclosure. FIG. 2 is a block diagram of the robot shown in FIG. 1. FIG. 3 is a perspective view of a vibration sensor provided to the robot shown in FIG. 1. FIG. 4 is a vertical cross-sectional view of the vibration sensor shown in FIG. 3. FIG. 5 is a transverse cross-sectional view of the vibration sensor shown in FIG. 3. FIG. 6 is a cross-sectional view of a sensor device provided to the vibration sensor shown in FIG. 3. FIG. 7 is a cross-sectional view of a force detection element provided to the sensor device shown in FIG. 6. FIG. 8 is a block diagram of a collision detection section provided to the robot shown in FIG. 1. FIG. 9 is a graph showing an example of a vibration signal output from the vibration sensor. FIG. 10 is a flowchart showing a method of controlling the robot shown in FIG. 1.

The robot 100 shown in FIG. 1 and FIG. 2 has a robot main body 1, a vibration sensor 2, a collision detection section 5 and a control device 6, wherein the vibration sensor 2 is provided to the robot main body 1 and detects a vibration generated in the robot main body 1, the collision detection section 5 detects a collision between the robot main body 1 and a foreign matter (a physical object) based on a vibration signal Sv output from the vibration sensor 2, and the control device 6 controls the drive of the robot main body 1 based on the detection result by the collision detection section 5. In such a robot 100, when the collision detection section 5 has detected the collision between the robot main body 1 and the foreign matter, the control device 6 switches the drive of the robot main body 1 from a normal drive mode to a safe drive mode to limit the drive of the robot main body 1 compared to the normal drive mode. Thus, the robot 100 can be made safer.

Robot Main Body

The robot main body 1 is a system for performing works such as feeding, removing, conveying, and assembling of precision mechanical equipment or a component constituting the precision mechanical equipment using a robot arm 10 equipped with an end effector 17. The robot main body 1 is a so-called 6-axis vertical articulated robot. As shown in FIG. 1, the robot main body 1 is provided with a platform 110 and the robot arm 10 rotatably coupled to the platform 110.

The platform 110 is fixed to, for example, the floor, the wall, the ceiling, or a movable carriage. Further, the robot arm 10 has an first arm 11, a second arm 12, a third arm 13, a fourth arm 14, a fifth arm 15, a sixth arm 16 and the end effector 17, wherein the first arm 11 is rotatably coupled to the platform 110, the second arm 12 is rotatably coupled to the first arm 11, the third arm 13 is rotatably coupled to the second arm 12, the fourth arm 14 is rotatably coupled to the third arm 13, the fifth arm 15 is rotatably coupled to the fourth arm 14, the sixth arm 16 is rotatably coupled to the fifth arm 15, and the end effector 17 is detachably coupled to the sixth arm 16. It should be noted that a part which allows two members coupled to each other out of the platform 110 and first arm 11 through the sixth arm 16 to bend or rotate against each other constitutes a "joint section."

Further, as shown in FIG. 2, the robot main body 1 has drive sections 130 for driving the respective joint sections of the robot arm 10, and angular sensors 131 for detecting driving states of the respective joint sections of the robot arm 10. The drive sections 130 are each configured including, for example, a motor and a reduction mechanism. The angular sensors 131 are each configured including, for example, a magnetic or optical rotary encoder.

Vibration Sensor

As shown in FIG. 1, the vibration sensor 2 is disposed between the first arm 11 and the platform 110. The vibration sensor 2 is a sensor for detecting a vibration of the robot arm 10 due to an external force applied to the robot arm 10. When the external force is applied to the robot arm 10 or the end effector 17, by providing such a vibration sensor 2, the external force is transmitted to the vibration sensor 2 via the robot arm 10 as a vibration, and it is possible to detect an amplitude of the vibration in the vibration sensor 2. Therefore, it becomes possible to perform the collision detection between the robot arm 10 or the end effector 17 and a foreign matter based on the vibration detected by the vibration sensor 2.

In the present embodiment, as the vibration sensor 2, there is used a 6-axis kinesthetic sensor capable of detecting 6-axis components of the external force applied to the vibration sensor 2. It should be noted that the 6-axis components comprise translational force components in respective directions of an α-axis, a β-axis and a γ-axis as three axes perpendicular to each other, and rotational force components around the respective these three axes.

As shown in FIG. 3, the vibration sensor 2 has four sensor devices 3 arranged around the central axis O thereof at regular intervals, and a case 4 housing these sensor devices 3. In such a vibration sensor 2, it is possible to detect the 6-axis components of the external force applied to the vibration sensor 2 by each of the sensor devices 3 outputting a detection signal corresponding to the external force received, and processing these detection signals, and thus, it is possible to detect the vibration from the 6-axis components thus detected.

The case 4 has a first case member 41, a second case member 42 and a sidewall section 43, wherein the second case member 42 is disposed with a distance from the first case member 41, and the sidewall section 43 is disposed on outer peripheral parts of the first case member 41 and the second case member 42. The constituent materials of the first case member 41, the second case member 42 and the sidewall section 43 are each not particularly limited, but there can be cited, for example, a metal material such as aluminum or stainless steel, or ceramics.

As shown in FIG. 4 and FIG. 5, the four sensor devices 3 are each clamped by a wall section 411 provided to the first case member 41 and a wall section 421 provided to the second case member 42. Further, pressurizing bolts 49 are fastened through the wall section 411 and the wall section 421, and thus, the first case member 41 and the second case member 42 are fixed to each other, and at the same time, the sensor device 3 is pressurized.

As shown in FIG. 6, each of the sensor devices 3 has a package 31 and a force detection element 32 housed in the package 31. The package 31 has a base body 311 and a lid body 312 bonded to the base body 311. Inside the package 31, there is formed an airtight housing space, and the force detection element 32 is housed in the housing space.

The force detection element 32 has a function of outputting a charge Qa corresponding to a component in an A-axis direction of the external force applied to the force detection element 32, and a charge Qb corresponding to a component of the external force applied to the force detection element 32 in a B-axis direction perpendicular to the A-axis direction and a pressurization direction. As shown in FIG. 7, the force detection element 32 has a first piezoelectric element 321, a second piezoelectric element 322 and a pair of support substrates 323, 324, wherein the first piezoelectric element 321 outputs the charge Qa in accordance with a shearing force in the A-axis direction, and the second piezoelectric element 322 outputs the charge Qb in accordance with a shearing force in the B-axis direction.

Further, the first piezoelectric element 321 has a configuration in which a ground electrode layer 321a, a piezoelectric layer 321b, an output electrode layer 321c, a piezoelectric layer 321d, a ground electrode layer 321e, a piezoelectric layer 321f, an output electrode layer 321g, a piezoelectric layer 321h and a ground electrode layer 321i are stacked on one another in this order from the right side in the drawing. The first piezoelectric element 321 having such a configuration outputs the charge Qa corresponding to the shearing force in the A-axis direction from the output electrode layers 321c, 321g. On the other hand, the second piezoelectric element 322 is stacked on the first piezoelectric element 321, and has a configuration in which a ground electrode layer 322a, a piezoelectric layer 322b, an output electrode layer 322c, a piezoelectric layer 322d, a ground electrode layer 322e, a piezoelectric layer 322f, an output electrode layer 322g, a piezoelectric layer 322h and a ground electrode layer 322i are stacked on one another in this order from the right side in the drawing. The second piezoelectric element 322 having such a configuration outputs the charge Qb corresponding to the shearing force in the B-axis direction from the output electrode layers 322c, 322g. It should be noted that in the present embodiment, the ground electrode layers 321i, 322a are commonalized.

Further, the piezoelectric layers 321b, 321d, 321f, 321h, 322b, 322d, 322f and 322h are each formed of quartz crystal. Thus, it is possible to provide the force detection element 32 with excellent characteristics such as high sensitivity, wide dynamic range, and high rigidity. Further, the piezoelectric layers 321b, 321d, 321f, 321h, 322b, 322d, 322f and 322h are each formed of a Y-cut quartz crystal plate in which the Y-axis as the mechanical axis of the quartz crystal is set in the thickness direction, and the X-axis as the electric axis is set in the arrow direction. It should be noted that, the piezoelectric layers 321b, 321d, 321f, 321h, 322b, 322d, 322*f* and 322*h* can each be provided with a configuration using other piezoelectric materials than the quartz crystal. As other piezoelectric materials than the quartz crystal, there can be cited, for example, topaz, barium titanate, lead titanate, lead zirconium titanate (PZT), lithium niobate, and lithium tantalate.

Such a vibration sensor 2 as described above has an external force detection circuit not shown, and the external force detection circuit is capable of calculating a translational force component $F\alpha$ in an $\alpha$-axis direction, a translational force component $F\gamma$ in a $\beta$-axis direction, a translational force component $F\gamma$ in a $\gamma$-axis direction, a rotational force component $M\alpha$ around the $\alpha$-axis, a rotational force component $M\beta$ around the $\beta$-axis, and a rotational force component $M\gamma$ around the $\gamma$-axis based on the charges Qa, Qb output from each of the sensor devices 3.

It should be noted that although in the present embodiment, the vibration sensor 2 is disposed between the first arm 11 and the platform 110 as described above, the arrangement of the vibration sensor 2 is not particularly limited providing the vibration generated in the robot main body 1 can be detected, and the vibration sensor 2 can also be provided to the robot arm 10 or the end effector 17, or can also be disposed between the platform 110 and the floor surface. Further, the vibration sensor 2 is not particularly limited providing the vibration generated in the robot main body 1 can be detected, and it is also possible to use any sensor such as an acceleration sensor, an angular velocity sensor, an inertial measurement unit (IMU) having a 3-axis acceleration sensor and a 3-axis angular velocity sensor combined with each other, or a torque sensor.

Collision Detection Section

The collision detection section 5 has a function of detecting a collision between the robot arm 10 or the end effector 17 and a foreign matter based on the vibration signal Sv output from the vibration sensor 2. It should be noted that the vibration signal Sv used by the collision detection section 5 for the collision detection is not particularly limited providing the signal is output from the vibration sensor 2. For example, since the vibration sensor 2 of the present embodiment outputs signals related to the translational force components $F\alpha$, $F\beta$ and $F\gamma$ and rotational force components $M\alpha$, $M\beta$ and $M\gamma$, it is also possible to use any one of these signals as the vibration signal Sv, or a signal obtained by combining two or more of these signals with each other as the vibration signal Sv. It should be noted that combining two or more of the signals means that it is possible to detect the collision based on a composite signal obtained by combining the two or more of the signals with each other, or to separately detect the collision based on the respective signals. Further, the foreign matter is not particularly limited, and can be any object such as a human, an animal other than a human, a structure such as another robot, the wall, the post, or the ceiling, or a dropping or dropped flying object.

Hereinafter, for the sake of convenience of explanation, the collision between the robot arm 10 and a foreign matter will be described as a representative, but the frequency of the vibration generated at the collision is significantly different depending on the hardness of the foreign matter. Specifically, when the conditions of the collision are the same, the softer the foreign matter is, the lower the frequency of the vibration generated at the collision becomes, and the harder the foreign matter is, the higher the frequency of the vibration generated at the collision becomes. Therefore, the collision detection section 5 is provided with a detection circuit used when the foreign matter is soft and a detection circuit used when the foreign matter is hard so that the collision can accurately be detected without being affected by the hardness of the foreign matter. Hereinafter, the configuration of the collision detection section 5 will specifically be described.

As shown in FIG. 8, the collision detection section 5 has a first detection section 51, a second detection section 52 and a collision determination section 53, wherein the first detection section 51 detects a collision between the robot arm 10 and a foreign matter based on the vibration signal Sv output from the vibration sensor 2, the second detection section 52 detects a collision between the robot arm 10 and a foreign matter based on an extracted vibration signal Sv' obtained by extracting a vibration component with the frequency not lower than a first predetermined value L from the vibration signal Sv, and the collision determination section 53 determines that the collision between the robot arm 10 and the foreign matter has occurred when the collision has been detected in at least one of the first detection section 51 and the second detection section 52. In such a configuration, a collision between the robot arm 10 and a soft foreign matter is detected by the first detection section 51, and a collision between the robot arm 10 and a hard foreign matter is detected by the second detection section 52. It should be noted that the first detection section 51, the second detection section 52 and the collision determination section 53 are not particularly limited providing the functions can be exerted, and each can be formed of an analog circuit, or can also be formed of a digital circuit.

Here, the "soft foreign matter" denotes a physical object having a Young's modulus smaller than a predetermined Young's modulus E, and the "hard foreign matter" denotes a physical object having a Young's modulus larger than the predetermined Young's modulus E. Further, the predetermined Young's modulus E can arbitrarily be set taking a work content of the robot 100, a peripheral structure and so on into consideration.

The first detection section 51 has a comparator 511 for comparing the vibration signal Sv output from the vibration sensor 2 and a first threshold value A1 with each other to output the result. For example, when the vibration signal Sv is higher than the first threshold value A1, a signal of "1" is output from the comparator 511, and when the vibration signal Sv is lower than the first threshold value A1, a signal of "0" is output from the comparator 511. The first threshold value A1 is set as a voltage value which cannot occur in the normal drive of the robot arm 10, and can occur due to a collision with a foreign matter. Thus, when the signal of "1" is output from the comparator 511, it is possible to determine that a collision between the robot arm 10 and a foreign matter has occurred, and in contrast, when the signal of "0" is output from the comparator 511, it is possible to determine that a collision between the robot arm 10 and a foreign matter has not occurred. This collision determination is also referred to as a first collision detection. It should be noted that the determination method of the first threshold value A1 is not particularly limited, and it is sufficient to, for example, drive the robot arm 10 in a normal state to measure the magnitude of the vibration generated in that occasion, make the robot arm 10 actually collide with a foreign matter to measure the magnitude of the vibration generated in that occasion, and then determine the first threshold value A1 to be a value between the measurement values. Further, it is possible for the first threshold value A1 to vary in accordance with, for example, a posture or a moving side of the robot arm 10.

Here, when, for example, the foreign matter is a relatively soft physical object such as a physical object formed of a resin material, in particular a soft resin material, or a human, the frequency of the vibration generated at the collision is as relatively low as several tens through several hundreds Hz, and is apt to become close in frequency range to the frequency of the vibration generated due to the drive of the robot arm 10. Further, the amplitude of the vibration at the collision is also relatively large. Therefore, by the comparison with the first threshold value A1, it is possible to detect the collision between the robot arm 10 and the foreign matter even from the vibration signal Sv in which the vibration due to the drive of the robot arm 10 and the vibration due to the collision are superimposed as in the area Q1 of the vibration shown in FIG. 9. In contrast, when, for example, the foreign matter is a relatively hard physical object such as a physical object formed of a metal material, the frequency of the vibration generated at the collision is as relatively high as several kHz, and is apt to be significantly different in frequency range from the frequency of the vibration generated due to the drive of the robot arm 10. Further, compared to when the foreign matter is soft, the amplitude of the vibration at the collision is apt to become relatively small. Therefore, as in the area Q2 of the vibration shown in FIG. 9, the vibration generated due to the collision hides in the vibration due to the drive of the robot arm 10, and it is difficult to detect the collision from the vibration signal Sv.

Therefore, the collision detection section 5 has the second detection section 52 for detecting a collision with a hard foreign matter. As shown in FIG. 8, the second detection section 52 has a high-pass filter 521 and a comparator 522, wherein the high-pass filter 521 extracts a high-frequency component due to the collision with the hard foreign matter from the vibration signal Sv from the vibration sensor 2 to obtain the extracted vibration signal Sv', and the comparator 522 compares the extracted vibration signal Sv' and a second threshold value A2 with each other to output the result. As described above, by using the high-pass filter 521, it is possible to extract the high-frequency component generated at the collision with the hard foreign matter from the vibration signal Sv to generate the extracted vibration signal Sv' with a simple circuit configuration. The first predetermined value L, namely a cutoff frequency, set to the high-pass filter 521 is higher than a frequency fα generated due to the normal drive of the robot arm 10, and is lower than a frequency fβ of the vibration generated due to the collision with the hard foreign matter. In other words, fα<L<fβ. It should be noted that the normal drive of the robot arm 10 means the state of performing a predetermined work without any abnormality. Further, fα can be determined in advance by normally driving the robot arm 10, and fβ can be determined by identifying the foreign matter which the robot arm 10 can collide from the work content of the robot 100, peripheral structures, and so on.

The comparator 522 compares the extracted vibration signal Sv' and the second threshold value A2 with each other to output the result. For example, when the extracted vibration signal Sv' is higher than the second threshold value A2, the signal of "1" is output from the comparator 522, and when the extracted vibration signal Sv' is lower than the second threshold value A2, the signal of "0" is output from the comparator 522. The second threshold value A2 is set as a voltage value which cannot occur in the normal drive of the robot arm 10, and can occur due to a collision with a foreign matter. Thus, when the signal of "1" is output from the comparator 522, it is possible to determine that a collision between the robot arm 10 and a foreign matter has occurred, and in contrast, when the signal of "0" is output from the comparator 522, it is possible to determine that a collision between the robot arm 10 and a foreign matter has not occurred. This collision determination is also referred to as a second collision detection. It should be noted that the determination method of the second threshold value A2 is not particularly limited, and it is sufficient to, for example, drive the robot arm 10 to measure the magnitude of the vibration generated in that occasion, make the robot arm 10 actually collide with a foreign matter to measure the magnitude of the vibration generated in that occasion, and then determine the second threshold value A2 to be a value between the measurement values. Further, it is possible for the second threshold value A2 to vary in accordance with, for example, a posture or a moving side of the robot arm 10.

Here, a sampling speed of the vibration sensor 2, in particular a detection rate (the period of outputting the detection signal), is not particularly limited, but is preferably not lower than 10 kHz, and is more preferably not lower than 12 kHz. As described above, since the frequency of the vibration generated when the robot arm 10 and the hard physical object collide with each other is around several kHz, by making the sampling speed of the vibration sensor 2 higher than the frequency, the vibration generated when the robot arm 10 and the hard physical object collide with each other can more surely be detected by the vibration sensor 2. In particular, the vibration sensor 2 uses the quartz crystal as the force detection element 32 as described above. The quartz crystal is sufficiently hard, and hardly deforms due to the force applied to the robot arm 10, and does not substantively require time for the restoration. Therefore, the vibration sensor 2 becomes a sensor capable of realizing the high sampling rate, and therefore, particularly suitable for the robot 100.

The collision determination section 53 has a function of determining that the collision has occurred when the collision between the robot arm 10 and the foreign matter has been detected in at least one of the first detection section 51 and the second detection section 52. As shown in FIG. 8, such a collision determination section 53 has an OR circuit 531. It is arranged that the signals from the comparators 511, 522 are input to the OR circuit 531, and when the signal of "1" is input from at least one of the comparators 511, 522, the OR circuit 531 outputs a signal of "1" on the grounds that the robot arm 10 and the foreign matter have collided with each other, or when the signal of "0" is input from each of the comparators 511, 522, the OR circuit 531 outputs a signal of "0" on the grounds that the robot arm 10 and the foreign matter have not collided with each other. By providing such a collision determination section 53, it is possible to detect the collision between the robot arm 10 and the foreign matter without being affected by the hardness of the foreign matter. It should be noted that in the present embodiment, the configuration of the collision determination section 53 is not particularly limited.

The collision detection section 5 is hereinabove described. It is assumed in the above description that the second detection section 52 has the function of detecting the collision between the robot arm 10 and the hard foreign matter, but depending on the configuration of the robot main body 1 and so on, a high-frequency vibration occurs together with the low-frequency vibration in some cases when the robot arm 10 and a soft foreign matter collide with each other. In such a case, it is possible to detect the high-frequency vibration by the second detection section 52. In other words, the second detection section 52 has a function of not only detecting the collision between the robot arm 10 and the hard foreign matter, but also detecting the collision between the robot arm 10 and the soft foreign matter.

Control Device 6

The control device 6 has a function of controlling the drive of the robot arm 10 based on the detection result by the collision detection section 5. As shown in FIG. 2, the control device 6 has a processor such as a central processing unit (CPU), a memory such as a read only memory (ROM) and a random access memory (RAM), and an I/F (an interface circuit). Further, by the processor arbitrarily reading and then executing a program stored in the memory, the control device 6 realizes processes such as control of the actions of the robot arm 10 and the end effector 17, and a variety of types of arithmetic operations and determinations. Further, the I/F is configured so as to be able to communicate with each of the robot main body 1, the end effector 17 and the collision detection section 5.

It should be noted that the control device 6 is disposed inside the platform 110 of the robot main body 1 in the illustrated configuration, but this is not a limitation, and it is also possible to dispose the control device 6, for example, outside the platform 110 or inside the robot arm 10. Further, it is also possible to couple a display device provided with a monitor such as a display, an input device provided with a mouse or a keyboard, and so on to the control device 6.

Further, it is possible for the control device 6 to have a normal drive mode for driving the robot arm 10 and the end effector 17 with a normal operation, and a safe drive mode for driving the robot arm 10 and the end effector 17 with a safe operation, and select one of these modes. It should be noted that the safe drive mode is not particularly limited, and can be defined as a mode in which some limitations are put on the normal drive mode. Specifically, there can be cited setting the angular velocity of each of the arms 11 through 16 to be lower than in the normal operation, setting the acceleration of each of the arms 11 through 16 to be lower than in the normal operation, setting the rotational range of each of the arms 11 through 16 to be smaller than in the normal operation, stopping the drive of the robot arm 10, and so on.

The control device 6 switches between the normal drive mode and the safe drive mode based on the result of the collision detection in the collision detection section 5. Specifically, the control device 6 drives the robot arm 10 in the safe drive mode while the collision determination section 53 is outputting the signal of "1" representing that the robot arm 10 and the foreign matter collide with each other, or drives the robot arm 10 in the normal drive mode while the collision determination section 53 is outputting the signal of "0" representing that the robot arm 10 and the foreign matter do not collide with each other. Thus, the excessive drive (drive with a high load) of the robot arm 10 when the collision with the foreign matter occurs is suppressed, and thus, it is possible to reduce the possibility of the failure of the robot arm 10. In particular, when the foreign matter with which the robot arm 10 collides is a human, it is possible to increase the human safety.

It should be noted that it is possible for the control device 6 to make a drive limitation of the robot arm 10 different between when the first detection section 51 has detected the collision between the robot arm 10 and the foreign matter, and when the second detection section 52 has detected the collision between the robot arm 10 and the foreign matter. In this case, it is sufficient for the control device 6 to have a first safe drive mode and a second safe drive mode as the safe drive mode, wherein the second safe drive mode is different in drive limitation from the first safe drive mode, and drive the robot arm 10 in the first safe drive mode when the first detection section 51 has detected the collision between the robot arm 10 and the foreign matter, or drive the robot arm 10 in the second safe drive mode when the second detection section 52 has detected the collision between the robot arm 10 and the foreign matter. The difference in limitation between the first safe drive mode and the second safe drive mode is not particularly limited, and it is sufficient to arbitrarily set the difference in accordance with use conditions of the robot 100. For example, when a human is assumed as the soft foreign matter and a wall located in the periphery of the robot 100 is assumed as the hard foreign matter, there is a higher necessity for ensuring the safety when having contact with the human. In such a case, it is sufficient to make the drive limitation in the first safe drive mode severer than the drive limitation in the second safe drive mode. Specifically, there can be cited setting the angular velocity of each of the arms 11 through 16 to be lower than in the second safe drive mode, setting the acceleration of each of the arms 11 through 16 to be lower than in the second safe drive mode, setting the rotational range of each of the arms 11 through 16 to be smaller than in the second safe drive mode, stopping the drive of the robot arm 10, and so on.

As described above, it is possible to omit the collision determination section 53 from the collision detection section 5 when making the drive limitation of the robot arm 10 different between when the first detection section 51 detects the collision between the robot arm 10 and the foreign matter and when the second detection section 52 detects the collision between the robot arm 10 and the foreign matter.

The configuration of the robot 100 is hereinabove described in detail. Then, a method of controlling the robot 100 will be described based on the flowchart shown in FIG. 10. Firstly, as the step S1, the collision detection section 5 obtains the vibration signal Sv from the vibration sensor 2. Then, as the step S2, the collision detection section 5 compares the vibration signal Sv and the first threshold value A1 with each other in the comparator 511 of the first detection section 51 to detect the presence or absence of the collision between the robot arm 10 and the foreign matter. When the collision between the robot arm 10 and the foreign matter has been detected by the first detection section 51, it is determined that the robot arm 10 and the foreign matter have collided with each other as the step S4. In contrast, when the collision between the robot arm 10 and the foreign matter has not been detected by the first detection section 51, the collision detection section 5 compares the extracted vibration signal Sv' and the second threshold value A2 with each other in the comparator 522 of the second detection section 52 to detect the presence or absence of the collision between the robot arm 10 and the foreign matter as the step S3. When the collision between the robot arm 10 and the foreign matter has been detected by the second detection section 52, it is determined that the robot arm 10 and the foreign matter have collided with each other. In contrast, when the collision between the robot arm 10 and the foreign matter has not been detected by the second detection section 52, the process returns to the step S1 to repeat the steps S1 through S3. According to such a control method, it is possible to more accurately detect the collision between the robot arm 10 and the foreign matter even when the foreign matter is soft or even when the foreign matter is hard, namely regardless of the hardness of the foreign matter. It should be noted that although the collision detection by the first detection section 51 is performed previous to the collision detection by the second detection section 52 in FIG. 10, this is not a limitation, and the order of the collision detection can also be reversed, or it is also possible to process the collision detection by the first detection section 51 and the collision detection by the second detection section 52 in parallel to each other.

As described above, such a robot 100 is provided with the robot main body 1, the vibration sensor 2 and the collision detection section 5, wherein the robot main body 1 has the platform 110, and the robot arm 10 displaced with respect to the platform 110, the vibration sensor 2 is provided to the robot main body 1 to detect the vibration of the robot main body 1, and the collision detection section 5 detects the collision between the robot main body 1 and a foreign matter as a physical object based on the output from the vibration sensor 2. Here, since the collision to be detected includes contact, the collision detection section can also be referred to as a contact detection section. Further, the collision detection section 5 has the first detection section 51 and the second detection section 52, wherein the first detection section 51 detects the collision based on the vibration signal Sv output from the vibration sensor 2, and the second detection section 52 detects the collision based on the extracted vibration signal Sv' obtained by extracting the vibration component with the frequency not lower than the first predetermined value L from the vibration signal Sv. According to such a configuration, it is possible to detect the collision with a soft foreign matter in the first detection section 51, and it is possible to detect the collision with a hard foreign matter in the second detection section 52. Therefore, it is possible to accurately detect the collision between the robot main body 1 and the foreign matter regardless of the hardness of the foreign matter.

Further, the control device 6 controls the drive of the robot main body 1 based on the detection result in the first detection section 51 and the second detection section 52. Thus, it is possible to more appropriately control the drive of the robot main body 1 in each of the state in which a collision with a foreign matter has not occurred and the state in which a collision with a foreign matter has occurred.

Further, as described above, the first detection section 51 determines that the collision with a foreign matter has occurred when the vibration signal Sv is larger than the first threshold value A1, and the second detection section 52 determines that the collision with a foreign matter has occurred when the extracted vibration signal Sv' is larger than the second threshold value A2. Thus, it is possible to detect the collision with a foreign matter with a simpler configuration.

Further, as described above, the collision detection section 5 has the collision determination section 53 which determines that the collision with a foreign matter has occurred when the collision with the foreign matter has been detected in at least one of the first detection section 51 and the second detection section 52. Thus, it is possible to accurately detect the collision between the robot main body 1 and the foreign matter regardless of the hardness of the foreign matter.

Further, the robot 100 has a control device 6 as a control section for controlling the drive of the robot main body 1. Further, it is possible for the control device 6 to make the drive limitation to be provided to the robot main body 1 different between when the first detection section 51 has detected the collision with the foreign matter, and when the second detection section 52 has detected the collision with the foreign matter. Thus, there is obtained the robot 100 capable of performing the drive more suitable for the situation.

Further, as described above, the sampling speed (the detection rate) of the vibration sensor 2 is not lower than 10 kHz. Thus, it is possible to obtain a more detailed vibration signal Sv, and in particular, a contact with a hard foreign matter can more surely be detected.

Further, as described above, in the method of controlling the robot 100, there are performed the first collision detection for detecting the collision with a foreign matter based on the vibration signal Sv output from the vibration sensor 2, and the second collision detection for detecting the collision with a foreign matter based on the extracted vibration signal Sv' obtained by extracting the vibration component with the frequency not lower than the first predetermined value L from the vibration signal Sv, and then the drive of the robot main body 1 is controlled based on the results of the first collision detection and the second collision detection. According to such a control method, it is possible to detect the collision with a soft foreign matter in the first collision detection, and it is possible to detect the collision with a hard foreign matter in the second collision detection. Therefore, it is possible to accurately detect the collision between the robot main body 1 and the foreign matter regardless of the hardness of the foreign matter.

Second Embodiment

Figure 11:
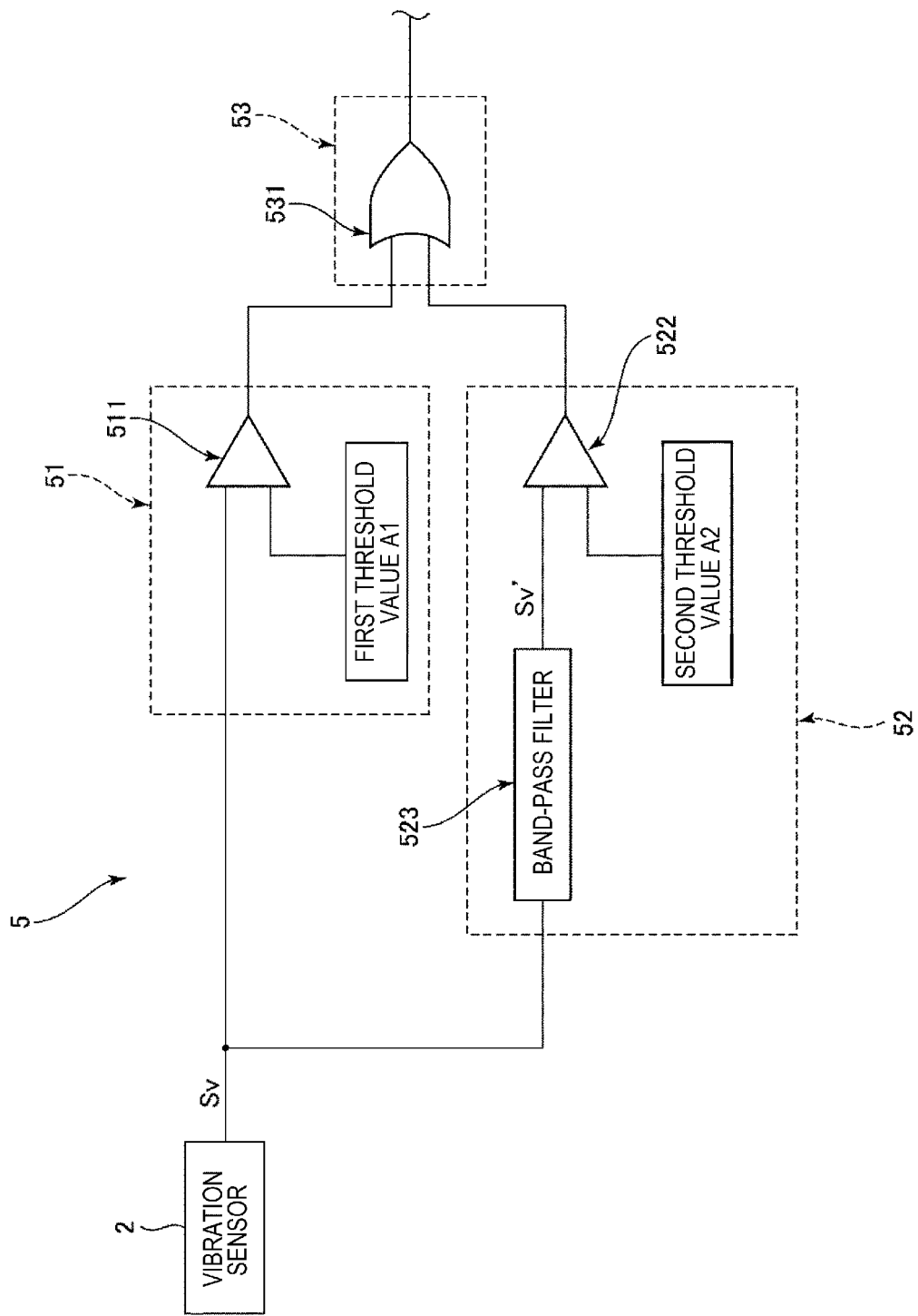
FIG. 11 is a block diagram of a collision detection section provided to a robot according to a second embodiment of the present disclosure.

FIG. 11 is a block diagram of a collision detection section provided to a robot according to a second embodiment of the present disclosure.

The robot 100 according to the present embodiment is substantially the same as the robot 100 according to the first embodiment described above except the point that the configuration of the collision detection section 5 is different. It should be noted that in the following description, the robot 100 according to the second embodiment will be described with a focus on the difference from the first embodiment described above, and the description of substantially the same issues will be omitted. Further, in FIG. 11, the constituents substantially the same as those of the first embodiment described above are denoted by the same reference symbols.

As shown in FIG. 11, the second detection section 52 of the present embodiment has a band-pass filter 523 and the comparator 522, wherein the band-pass filter 523 extracts a high-frequency component from the vibration signal Sv from the vibration sensor 2 to obtain the extracted vibration signal Sv', and the comparator 522 compares the extracted vibration signal Sv' and the second threshold value A2 with each other to output the result. As described above, by using the band-pass filter 523, it is possible to extract the high-frequency component from the vibration signal Sv to generate the extracted vibration signal Sv' with a simple circuit configuration. It should be noted that the pass band of the band-pass filter 523 is arranged to extract the vibration component with the frequency higher than the first predetermined value L and not higher than a second predetermined value H higher than the first predetermined value L from the vibration signal Sv. The first predetermined value L (the lower limit frequency of the pass band) is higher than the frequency $f\alpha$ generated due to the normal drive of the robot arm 10, and is lower than the frequency $f\beta$ of the vibration generated due to the collision with the hard foreign matter. On the other hand, the second predetermined value H (the upper limit frequency of the pass band) is higher than the frequency $f\beta$. In other words, $f\alpha < L < f\beta < H$. It should be noted that the width from the first predetermined value L to the second predetermined value H may be set as small as possible. Thus, the extracted vibration signal Sv' less in noise can be extracted.

As described above, the second detection section 52 is configured so as to extract the vibration component with the frequency not lower than the first predetermined value L and not higher than the second predetermined value H higher than the first predetermined value L from the vibration signal Sv as the extracted vibration signal Sv'. Thus, since it is possible to narrow the pass band compared to, for example, the high-pass filter 521 of the first embodiment described above, the extracted vibration signal Sv' less in noise can be extracted.

According also to such a second embodiment as described hereinabove, substantially the same advantages as in the first embodiment described above can be exerted.

Third Embodiment

Figure 12:
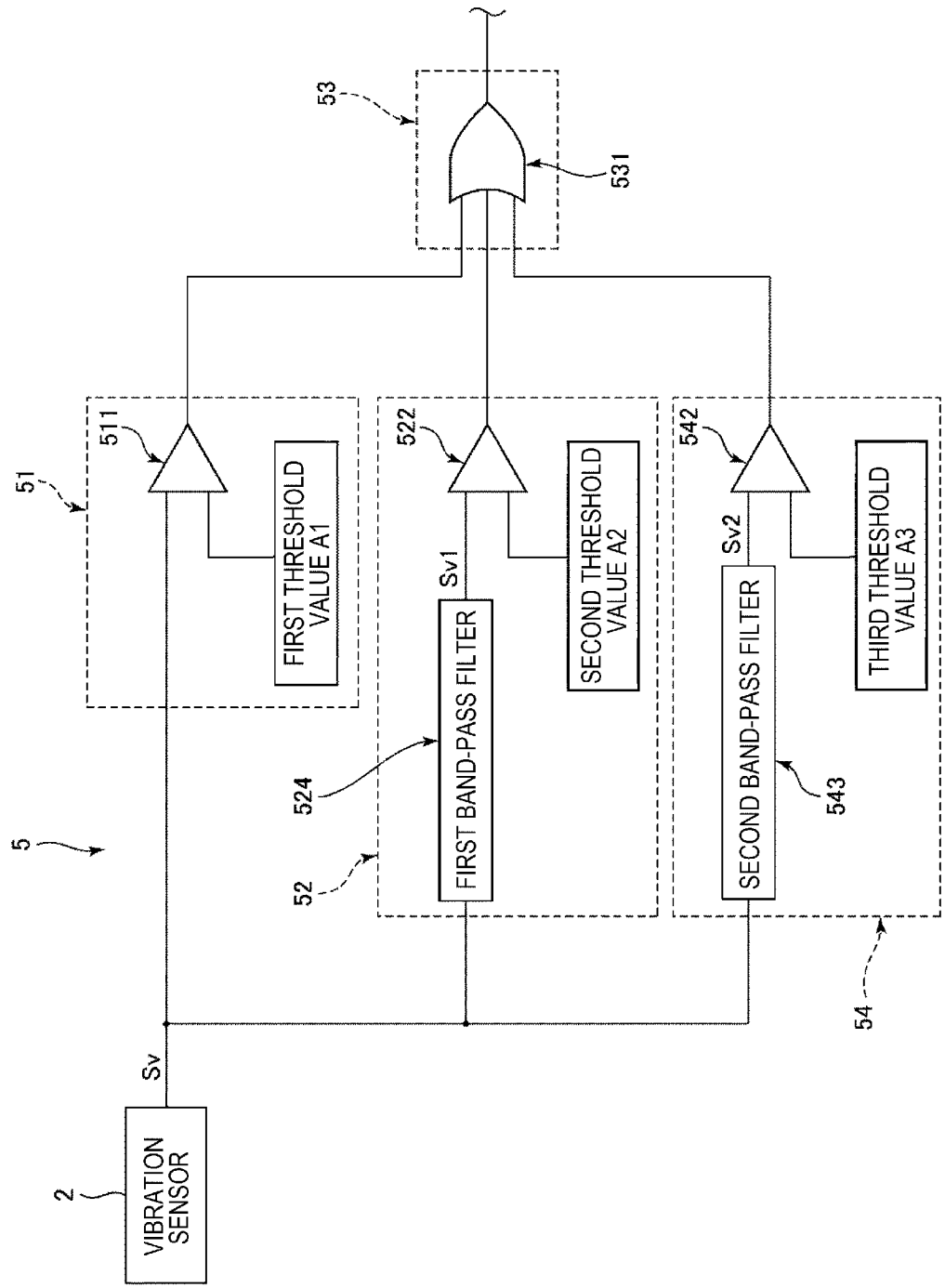
FIG. 12 is a block diagram of a collision detection section provided to a robot according to a third embodiment of the present disclosure.

FIG. 12 is a block diagram of a collision detection section provided to a robot according to a third embodiment of the present disclosure.

The robot 100 according to the present embodiment is substantially the same as the robot 100 according to the first embodiment described above except the point that the configuration of the collision detection section 5 is different. It should be noted that in the following description, the robot 100 according to the third embodiment will be described with a focus on the difference from the first embodiment described above, and the description of substantially the same issues will be omitted. Further, in FIG. 12, the constituents substantially the same as those of the first embodiment described above are denoted by the same reference symbols.

As shown in FIG. 12, the collision detection section 5 in the present embodiment has the first detection section 51, the second detection section 52, a third detection section 54 and the collision determination section 53, wherein the first detection section 51 detects the collision between the robot arm 10 and the foreign matter based on the vibration signal Sv output from the vibration sensor 2, the second detection section 52 detects the collision between the robot arm 10 and the foreign matter based on a first extracted vibration signal Sv1 obtained by extracting a vibration component in a first frequency band from the vibration signal Sv, the third detection section 54 detects the collision between the robot arm 10 and the foreign matter based on a second extracted vibration signal Sv2 obtained by extracting a vibration component in a second frequency band from the vibration signal Sv, and the collision determination section 53 determines that the collision between the robot arm 10 and the foreign matter has occurred when the collision has been detected in at least one of the first detection section 51, the second detection section 52 and the third detection section 54.

In such a configuration, a collision between the robot arm 10 and a soft foreign matter is detected by the first detection section 51, and a collision between the robot arm 10 and a hard foreign matter is detected by the second detection section 52 and the third detection section 54. Here, even in the collision between the robot arm 10 and a hard foreign matter, the frequency of the vibration generated in the robot arm 10 differs in some cases by what part of the robot arm 10 collides with the foreign matter. For example, a skeleton part playing a role of coupling to the adjacent arm is formed of a metal material having a sufficient rigidity, while a resin material softer than the metal material is used for a cover member covering the skeleton in many cases for the purpose of reduction in weight. Due also to a contribution of such a difference in material, the frequency of vibration is different in some cases between, for example, a vibration caused by a collision between the skeleton and a foreign matter and then propagated to the vibration sensor 2 via the skeleton, and a vibration caused by a collision between the cover member and a foreign matter and then propagated to the vibration sensor 2 via the cover member.

Therefore, in the present embodiment, there is adopted a configuration in which the vibration propagating along the skeleton is detected by the second detection section 52, and the vibration propagating along the cover member is detected by the third detection section 54. The second detection section 52 has a first band-pass filter 524 and the comparator 522, wherein the first band-pass filter 524 extracts a high-frequency component from the vibration signal Sv to obtain the first extracted vibration signal Sv1, and the comparator 522 compares the first extracted vibration signal Sv1 and the second threshold value A2 with each other to output the result. It should be noted that the pass band of the first band-pass filter 524 is arranged to extract the vibration component with the frequency not lower than a predetermined value L1 and not higher than a predetermined value H1 higher than the predetermined value L1 from the vibration signal Sv. The predetermined value L1 (the lower limit frequency of the pass band) is higher than the frequency $f\alpha$ generated due to the normal drive of the robot arm 10, and is lower than the frequency $f\gamma$ of the vibration generated in the skeleton due to the collision with the hard foreign matter. On the other hand, the predetermined value H1 (the upper limit frequency of the pass band) is higher than the frequency $f\gamma$. In other words, $f\alpha < L1 < f\gamma < H1$. It should be noted that the width from the predetermined value L1 to the predetermined value H1 may be set as small as possible. Thus, the vibration component other than the vibration caused by the collision can effectively be removed, and thus the first extracted vibration signal Sv1 less in noise can be generated.

The comparator 522 compares the first extracted vibration signal Sv1 and the second threshold value A2 with each other to output the result. For example, when the first extracted vibration signal Sv1 is higher than the second threshold value A2, the signal of "1" is output from the comparator 522, and when the first extracted vibration signal Sv1 is lower than the second threshold value A2, the signal of "0" is output from the comparator 522. The second threshold value A2 is set as a voltage value which cannot occur in the normal drive of the robot arm 10, and can occur due to a collision with a foreign matter. Thus, when the signal of "1" is output from the comparator 522, it is possible to determine that a collision between the robot arm 10 and a foreign matter has occurred, and in contrast, when the signal of "0" is output from the comparator 522, it is possible to determine that a collision between the robot arm 10 and a foreign matter has not occurred.

The third detection section 54 has a second band-pass filter 543 and a comparator 542, wherein the second band-pass filter 543 extracts a high-frequency component from the vibration signal Sv to obtain the second extracted vibration signal Sv2, and the comparator 542 compares the second extracted vibration signal Sv2 and a third threshold value A3 with each other to output the result. It should be noted that the pass band of the second band-pass filter 543 is arranged to extract the vibration component with the frequency not lower than a predetermined value L2 and not higher than a predetermined value H2 higher than the predetermined value L2 from the vibration signal Sv. The predetermined value L2 (the lower limit frequency of the pass band) is higher than the frequency $f\alpha$ generated due to the normal drive of the robot arm 10, and is lower than the frequency fδ of the vibration generated in the cover member due to the collision with the hard foreign matter. On the other hand, the predetermined value H2 (the upper limit frequency of the pass band) is higher than the frequency fδ. In other words, fα<L2<fδ<H2. It should be noted that the width from the predetermined value L2 to the predetermined value H2 may be set as small as possible. Thus, the vibration component other than the vibration caused by the collision can effectively be removed, and thus the second extracted vibration signal Sv2 less in noise can be generated.

The comparator 542 compares the second extracted vibration signal Sv2 and the third threshold value A3 with each other to output the result. For example, when the second extracted vibration signal Sv2 is higher than the third threshold value A3, the signal of "1" is output from the comparator 542, and when the second extracted vibration signal Sv2 is lower than the third threshold value A3, the signal of "0" is output from the comparator 542. The third threshold value A3 is set as a voltage value which cannot occur in the normal drive of the robot arm 10, and can occur due to a collision with a foreign matter. Thus, when the signal of "1" is output from the comparator 542, it is possible to determine that a collision between the robot arm 10 and a foreign matter has occurred, and in contrast, when the signal of "0" is output from the comparator 542, it is possible to determine that a collision between the robot arm 10 and a foreign matter has not occurred.

According also to such a third embodiment as described hereinabove, substantially the same advantages as in the first embodiment described above can be exerted.

Although the robot, the control device and the control method according to the present disclosure are described hereinabove based on the illustrated embodiments, the present disclosure is not limited to these embodiments, but the configuration of each of the constituents can be replaced with those having an identical function and an arbitrary configuration. Further, it is also possible to add any other constituents to the present disclosure. Further, the present disclosure can be a combination of any two or more of configurations out of the embodiments described above.

Further, the robot according to the present disclosure is not limited to a single-arm robot, and can also be another robot such as a dual-arm robot or a scalar robot. Further, the number of the arms (the number of the joints) provided to the robot arm is not limited to the number in the embodiments described above, but can also be in a range from one to five, or not smaller than seven.

What is claimed is:

1. A robot comprising:
a robot main body having a platform and a robot arm displaced with respect to the platform;
a vibration sensor provided to the robot main body to detect a vibration of the robot main body; and
a collision detection section configured to detect a collision between the robot main body and a physical object based on an output from the vibration sensor, wherein
the collision detection section includes
a first detection section configured to detect the collision based on a vibration signal output from the vibration sensor, and
a second detection section configured to detect the collision based on an extracted vibration signal obtained by extracting a vibration component with a frequency not lower than a first predetermined value from the vibration signal,
the robot further comprising:
a control section configured to control drive of the robot main body, wherein
the control section makes a drive limitation provided to the robot main body different between when the first detection section has detected the collision and when the second detection section has detected the collision.

2. The robot according to claim 1, wherein
the first detection section determines the collision when the vibration signal is larger than a first threshold value, and
the second detection section determines the collision when the extracted vibration signal is larger than a second threshold value.

3. The robot according to claim 1, wherein
a detection rate of the vibration sensor is not lower than 10 kHz.

4. The robot according to claim 1, wherein
the second detection section extracts a vibration component with a frequency not lower than the first predetermined value and not higher than a second predetermined value higher than the first predetermined value from the vibration signal as the extracted vibration signal.

5. A control device configured to control drive of a robot including a robot main body having a platform and a robot arm displaced with respect to the platform, a vibration sensor provided to the robot main body to detect a vibration of the robot main body, and a collision detection section configured to detect a collision between the robot main body and a physical object based on an output from the vibration sensor, wherein
the collision detection section includes
a first detection section configured to detect the collision based on a vibration signal output from the vibration sensor, and
a second detection section configured to detect the collision based on an extracted vibration signal obtained by extracting a vibration component with a frequency not lower than a first predetermined value from the vibration signal, and
the control device makes a drive limitation provided to the robot main body different between when the first detection section has detected the collision and when the second detection section has detected the collision.

6. A method of controlling drive of a robot including a robot main body having a platform and a robot arm displaced with respect to the platform, and a vibration sensor provided to the robot main body to detect a vibration of the robot main body, the method comprising:
detecting a first collision based on a vibration signal output from the vibration sensor;
detecting a second collision based on an extracted vibration signal obtained by extracting a vibration component with a frequency not lower than a first predetermined value from the vibration signal; and
making a drive limitation provided to the robot main body different between when the first collision has been detected and when the second collision has been detected.

* * * * *